United States Patent [19]

Waintroob

[11] Patent Number: 5,121,253
[45] Date of Patent: Jun. 9, 1992

[54] VISOR FOR A COMPUTER TERMINAL DISPLAY AND METHOD

[76] Inventor: Stewart B. Waintroob, 3175 N. Price Rd., No. 1092, Chandler, Ariz. 85224

[21] Appl. No.: 635,290

[22] Filed: Dec. 28, 1990

[51] Int. Cl.⁵ ............................................ G02B 27/00
[52] U.S. Cl. .................................. 359/601; 359/609; 358/252
[58] Field of Search ............... 359/601, 614, 610, 599, 359/609; 358/252, 255, 253

[56] References Cited

U.S. PATENT DOCUMENTS

| | | |
|---|---|---|
| 2,612,612 | 9/1952 | Szegho et al. |
| 2,955,507 | 10/1960 | Leitz |
| 3,378,636 | 4/1968 | Hamilton |
| 3,718,078 | 2/1973 | Plummer ............................ 359/601 |
| 4,114,983 | 9/1978 | Maffitt et al. ....................... 359/580 |
| 4,190,321 | 2/1980 | Dorer et al. ........................ 359/581 |
| 4,340,276 | 7/1982 | Maffitt et al. ....................... 359/581 |
| 4,427,264 | 1/1984 | Kamerling .......................... 358/252 |
| 4,569,572 | 2/1986 | Kopich ............................... 359/601 |
| 4,753,516 | 6/1988 | Doi et al. ............................ 359/609 |
| 4,772,096 | 9/1988 | Kai et al. ............................ 359/601 |

Primary Examiner—Loha Ben
Attorney, Agent, or Firm—Harry M. Weiss

[57] ABSTRACT

A display visor for attaching to a display unit of a computer work station and for minimizing the magnitude and amount and intensity of reflected light beams caused by light beams projected by the screen of a computer display unit. The display visor includes a left wall having a left inner layer and a right wall having a right inner layer and a top wall having a top inner layer. Each inner layer is a granular layer of a substantially black coloring for diffusing a part of the projected light beam in inner surface recesses of each inner layer and for absorbing another part of the projected light beam in the substantially black coloring.

14 Claims, 2 Drawing Sheets

VISOR FOR A COMPUTER TERMINAL DISPLAY AND METHOD

The invention generally relates to a visor for display type equipment and method, and, in particular, the invention relates to a visor for a computer display and method having means including a light absorbing and non-reflecting inner surface that increases visual contrast on the display including color and depth, reduces glare, avoids wash out of images on the display, reduces total Ultra Violet light exposure from the display, and permits a user of the display much greater comfort and ease in the use of the display thereby providing a higher level of concentration and focus on the images located on the display.

BACKGROUND OF THE INVENTION

The prior art display visor for connection to a monitor or display terminal of a computer generally comprised left, right and top walls wherein the inner surface of each wall was not able to adequately reduce the glare and light intensity that is reflected from the display off the inner surface of each wall of the visor to the eyes of a person viewing the monitor or display.

One major problem associated with the prior art display visor is that such reflected light from the inner surfaces of the walls of the visor are simultaneously viewed by a user along with the information contained on the display thereby causing a difficulty in seeing the specific contents on the monitor screen without visual interference, also known as visual noise, glare, and good contrast.

U.S. Pat. No. 4,340,276 discloses a method for reducing reflectivity on the surface of a lens, window or similar light transparent medium. There is no suggestion, disclosure nor teaching in this reference of a visor for a display nor how the disclosed method could be used to provide a visor with an internal continued black and granular surface to reduce glare.

U.S. Pat. No. 4,114,983 discloses a light transmission type optical element which has an anti-reflecting surface. There is no suggestion, disclosure nor teaching in this reference of a visor for a display now how the disclosed light transmission type optical element with its anti-reflecting surface could be used to provide a visor with an internal combined black and granular surface to reduce glare.

U.S. Pat. No. 3,378,636 discloses a light filter mounted on a color television tube. The filter body is made of transparent material and incorporates a plurality of filter elements wherein each element constitutes a tier of alternating transparent and light absorbing areas to provide multiple light transmitting apertures bordered by light absorbing material. There is no suggestion, disclosure nor teaching in this reference of a visor for a display nor how the filter with its multiple light transmitting apertures bordered by light absorbing material could be used to provide a visor with an internal combined black and granular surface to reduce glare.

U.S. Pat. No. 2,955,507 discloses a focusing plate or lens type device wherein a rough surface on the plate acts to diminish focusing and a ground glass surface area serves to provide sharp focusing. There is no disclosure of a visor for a display nor how the focusing plate could be used with its light transmissive and opaque regions to provide a visor with an internal combined black and granular surface to reduce glare.

U.S. Pat. No. 2,612,612 discloses a Cathode Ray Tube having a light transmissive glass face plate thereon which has protuberances thereon to reduce the reflectivity of the viewing plate. There is no disclosure of a visor for a display nor how the light transmissive glass face plate can be used to provide a visor with an internal combined black and granular surface to reduce glare.

U.S. Pat. No. 4,772,096 discloses a light shade which uses a plurality of opaque walls located along the thickness of a light transmissive medium thereby defining light transmissive cells. A light transmissive substrate plate has one surface attached to the light shade while the other surface of the light transmissive substrate is microscopically rugged. However, there is no disclosure of a visor having an internal combined black and granular surface to reduce glare nor how the light shade can be used to provide a visor with an internal combined black and granular surface to reduce glare.

U.S. Pat. No. 4,190,321 discloses a coating technique for use on, for example, optical devices such as lenses or windows wherein a metal layer is deposited which layer is then formed into an oxide layer and the surface thereof converted into a plurality of leaflets to provide an anti-reflecting surface. However, there is no disclosure of a visor or the use of a visor having an internal combined black and granular surface to reduce glare nor now the coating technique can be used to form a visor having an internal combined black and granular surface to reduce glare.

U.S. Pat. No. 4,753,516 discloses an anti-reflection plate for a display device which uses two layers on a transparent substrate. One layer is flat and transparent while the second layer applied to the first layer has an uneven surface thereon to prevent reflection of external light on a screen of a display device. However, there is no disclosure of a visor nor of a visor for a computer display that has an internal combined black and granular surface to reduce glare.

None of the above cited references teach or disclose a visor for a computer terminal display that incorporates combining both a black or light absorbing and non-reflecting inner surface on the walls of the visor to achieve all of the advantages noted above associated therewith.

SUMMARY OF THE INVENTION

Accordingly, it is an object of this invention to provide an improved visor for a computer display and method.

It is another object of this invention to provide an improved visor for a computer terminal display and method wherein the inner surfaces of the walls of the visor function to increase visual contrast on the display including color and depth reduce glare, avoid wash out of the images on the display, and permits a user of the display much greater comfort and ease in the use of the display thereby providing a higher level of concentration and focus on the images located on the display.

It is still another object of this invention to provide an improved visor for a computer display and method wherein ultra violet light exposure from the display is reduced.

BRIEF DESCRIPTION OF THE INVENTION

According to the present invention, a display visor for connection to a monitor or display of a computer is provided. This display visor comprises a left wall, a right wall and a top wall respectively having a left inner surface, a right inner surface and a top inner surface, each inner surface is a black, granular layer means having recesses and projections for both absorbing light and preventing light reflection.

By using the light absorbing and non-reflecting inner surfaces, the problems and the difficulties described above in viewing the monitor screen or display is greatly minimized or avoided.

The foregoing and other objects, features and advantage will be apparent from the following description of the preferred embodiment of the invention as illustrated in the accompanying drawings.

DESCRIPTION OF THE PREFERRED EMBODIMENT

Figure 1:
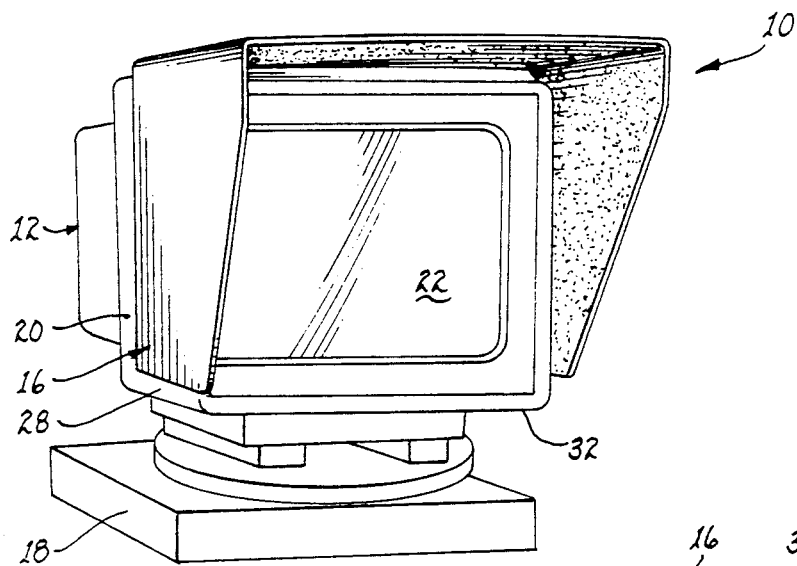
FIG. 1 is a perspective view of a computer assembly according to the invention showing the visor mounted in front of a computer terminal display.
Figure 2:
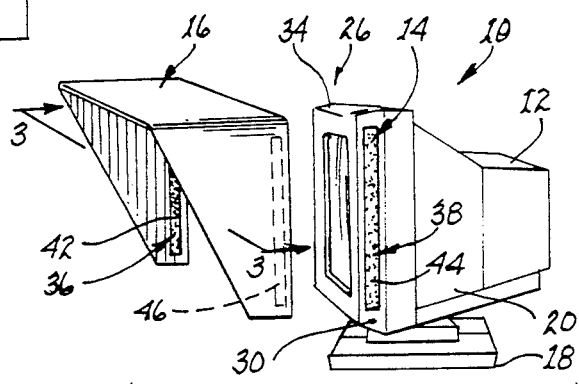
FIG. 2 is an exploded view of the computer assembly of FIG. 1 showing the visor and the means to attachment of the visor to the computer terminal display.
Figure 3:
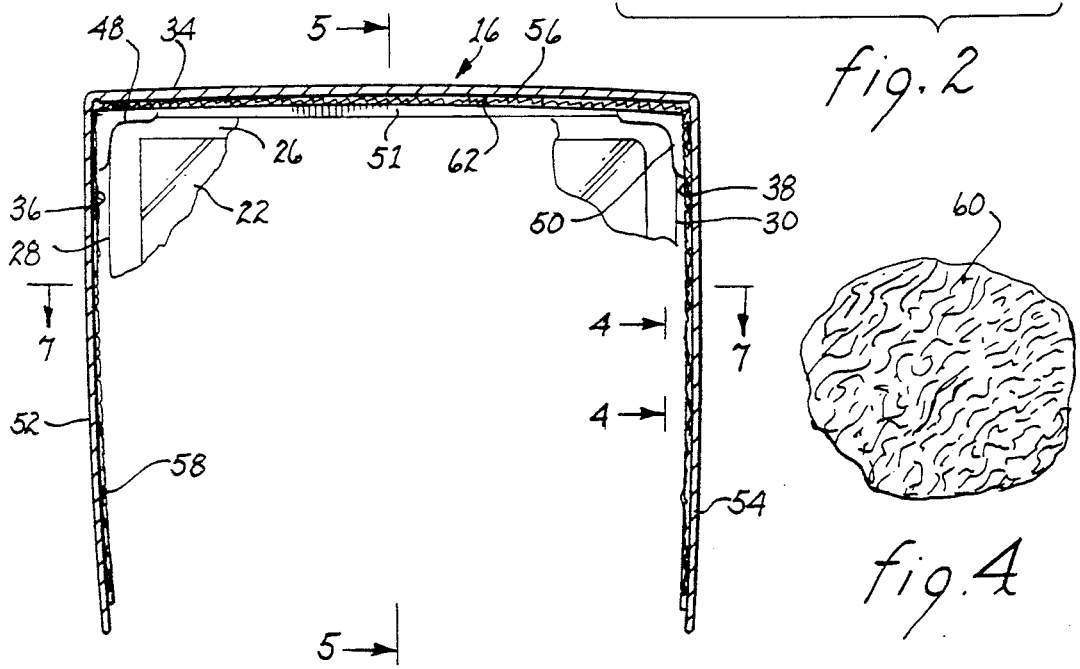
FIG. 3 is a section view as taken along line 3—3 of FIG. 2.

As shown in FIGS. 1 through 6, a computer work station assembly 10 is provided. Assembly 10 includes a computer monitor or display subassembly 12 and a connector subassembly 14 (see FIG. 2) and a hood or visor subassembly 16.

Display subassembly 12 preferably includes a base 18 and a computer display component or unit 20, which, preferably, can be angularly displaced relative to base 18. Display unit 20 has a preferably glass window or screen 22 (see FIG. 1), which preferably has a convex outer surface 24 (see FIG. 7). Display unit 20 also has a rectangular frame 26 (see FIG. 2), which is disposed around screen 22. Frame 26 has left and right bezels or side surfaces 28, 30 (see FIG. 3). Frame 26 also has bottom and top side surfaces 32 (see FIG. 1), 34 (see FIG. 2). Display subassembly 12 and visor subassembly 16 respectively have matching outer surface colors which are preferably a granular beige type surface.

Connector subassembly 14 includes left and right minute hook and loop strips 36, 38 (see FIG. 3), which are sold under the trademark "VELCRO". Left strip 36 has a preferably adhesive backed hook strip portion and a preferably adhesive-backed loop strip portion 42 (see FIG. 2). Right strip 38 also has a preferably adhesive-backed hook strip portion 44 and a preferably adhesive-backed loop strip portion 46. The two hook strip portions including hook strip portion 44 are respectively attached to left side surface 28 (see FIG. 1) and right side surface 30 (see FIG. 2). Left and right strips 36, 38 have respective upper corner substantially L-shaped foam pieces 48, 50 (see FIGS. 3, 4, 5, and 6) in contact therewith at the upper portion of the strips 36, 38. These two corner pieces 48, 50 are important in protecting against unwanted light entering the interior of the visor 16 from the corners of the display subassembly 12 and also serve to compensate for various different corner shapes for the display subassembly 12. A continuous lip or bent extension portion 5 (see FIGS. 3 and 5) which is preferably at a 90 degree angle extends from top wall 56 along the back of the visor 16. The end of the bent extension portion 51 is used to be placed in the groove between the top surface 34 and the remainder of the display 20 thereby positioning the top wall 56 slightly above the top of the surface 34 to provide a better and more complete view of the images on the display 20.

Figure 4:
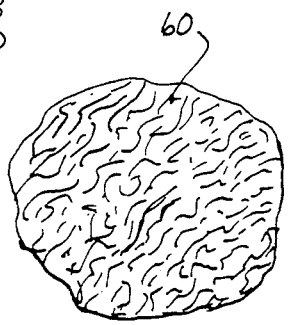
FIG. 4 is an elevation view of a portion of the inner surface of the visor of FIG. 1 as taken along line 4—4 of FIG. 3.
Figure 5:
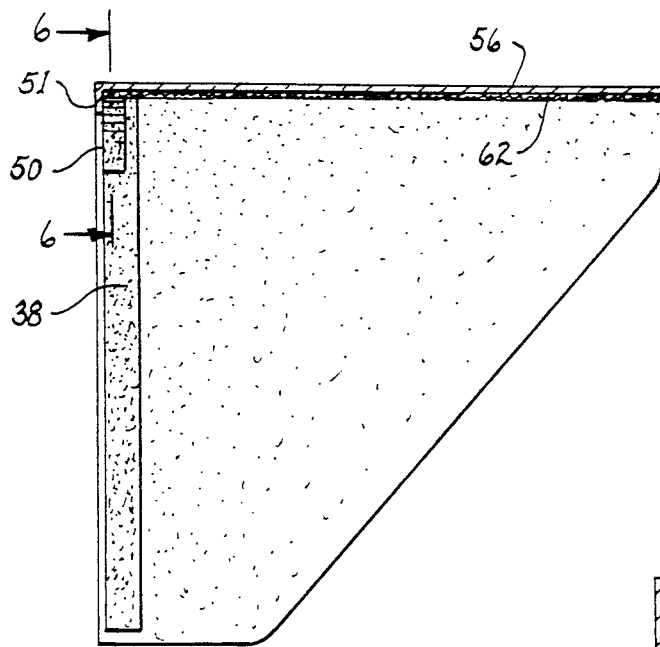
FIG. 5 is a section view as taken along line 5—5 of FIG. 3.
Figure 6:
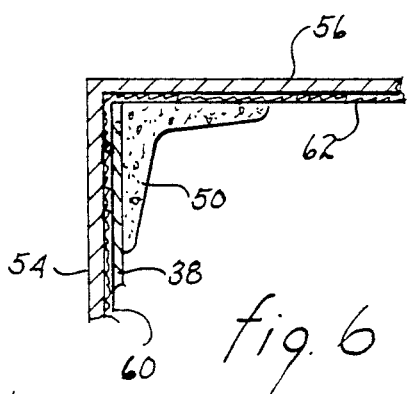
FIG. 6 is a section view as taken along line 6—6 of FIG. 5 illustrating one of the two corners of the visor.

Visor subassembly 16 has left and right side walls 52, 54 (see FIG. 3), and has top wall 56. Walls 52, 54, 56 are preferably made of a semi-flexible plastic material for ease of fitting walls 52, 54, 56 to left, right and top side surfaces 28 (see FIG. 1), 30, 34 (see FIG. 2) of the display 12. Left, right and top walls 52, 54, 56 (see FIG. 3) of the visor 16 respectively have left, right and top light absorbing inner layers 58, 60, 62 which also serve the additional function of preventing the reflection of light. Layers 58, 60, 62 are shown exaggerated in thickness in the drawings for ease of illustration. Layers 58, 60 62 are composed of a black granular material wherein the black serves to absorb light while the granular surface serves to prevent the reflection of light toward the viewer from the two sides and top of visor 16. FIG. 4 depicts the granular surface of the portion of layer 60.

Figure 8:
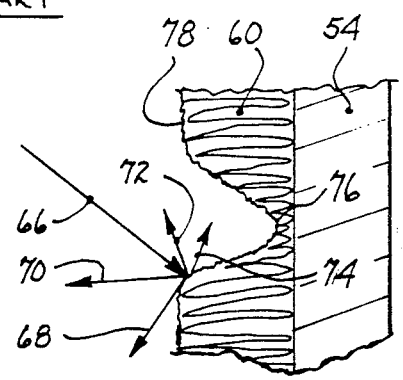
FIG. 8 is an enlarged view of a small portion of the inner surface of the visor depicting in more detail the operation of the inner surface of the visor on light striking the visor's inner surface as shown in FIG. 7.
Figure 7:
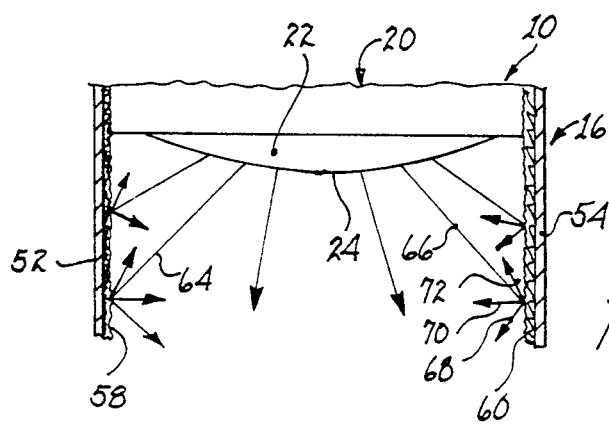
FIG. 7 is a section view as taken along line 7—7 of FIG. 3 depicting the operation of the inner surface of the visor on light striking the visor's inner surface.

As shown in FIG. 7, screen 22 projects a plurality of left and right light beams 64, 66 as well as light beans wall directions including up and down. Similar top (or upwardly directed) light beams (not shown) are also projected by screen 22. Typical beam 66, which is like beam 64, has reflected light beam portions 68, 70, 72. As shown in FIG. 8, a reflected light beam portion 74 is dissipated and absorbed by the black granular material of layer 60. Black granular side layer 60 (like layers 58 and 62) has minute recesses like recess 76 and projections like projection 78 (see FIG. 8). Light beam portion 74 is reflected back and forth within recess 76 and thus, this reflected light beam portion 74 is prevented from being reflected toward the viewer and is finally absorbed within the recess 76. Thus, the combination of the black (light absorbing material) and the granular (to prevent light reflection) surface cooperate together to provide to a viewer a dramatic increase in contrast for both color and depth, an elimination of a wash out of the images being viewed, relief from undesired glare and light reflection off the walls of the visor 16, greater clarity, focus and concentration, elimination of visual noise or interference and absorption of undesired UV (Ultra Violet) light radiation. A part or portion of the projected light beam 66 is directly absorbed by the light absorbing black material of layer 60.

Advantages of visor subassembly 16 are briefly indicated hereafter.

A) A dramatically increased contrast, both in color and depth are provided by visor subassembly 16.

B) Glare is substantially eliminated by visor subassembly 16.

C) Visual noise is substantially minimized.

D) Focus and concentration by a user is facilitated.

E) Layers 58, 60, 62 of visor 16 reduce total Ultra Violet (UV) light exposure.

F) Connector subassembly 14 permits easy adjustment, attachment or removal of the visor subassembly 16 from the work station assembly 10.

G) Walls 52, 54, 56 of visor subassembly 16, which are made of a semi-flexible plastic material, facilitate the assembly or adaptation of visor subassembly 16 onto the display unit 20.

Figure 9:
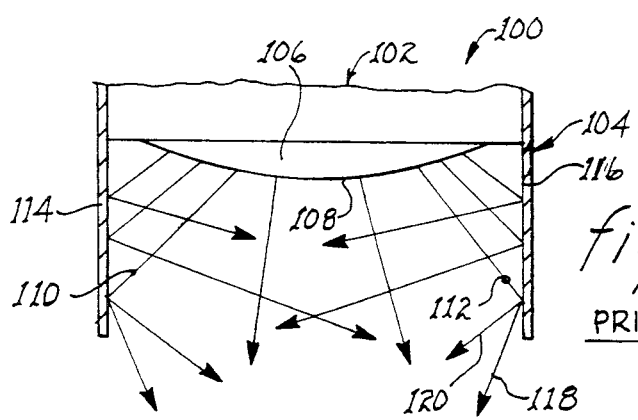
FIG. 9 is a section view of a prior art computer work station assembly and attached visor corresponding to FIG. 7, but depicting the reflection of light striking the inner surface of the prior art visor.

As shown in FIG. 9, a prior art assembly 100 is illustrated for comparison with assembly 10. Assembly 100 has a display unit 102 and a visor subassembly 104. Display unit 102 has a screen 106 which has an outer convex surface 108. Screen 106 projects a plurality of left and right light beams 110, 112, which are not substantially absorbed or diffused by its left and right walls 114, 116. Typical beam 112, like beam 110, has reflected light beam portions 118, 120, which are substantially larger in intensity and amount than the light beam portions 68, 70, 72, 74 (see FIG. 8) of corresponding light beam 66 of assembly 10 according to the invention.

While the invention has been described in its preferred embodiment, it is to be understood that the words which have been used are words of description rather than limitation and that changes may be made within the purview of the appended claims without departing from the true scope and spirit of the invention in its broader aspects. For example, layers 58, 60, 62 may be a deposited layer or coating or a painted layer, which has a granular or grain-like texture of black, or the like, coloring.

The embodiments of an invention in which an exclusive property or right is claimed are defined as follows:

I claim:

1. A display visor for connection to a display unit of a computer work station comprising:
   a left wall, a right wall and a top wall;
   said left wall having a left inner layer;
   said right wall having a right inner layer;
   said top wall having a top inner layer;
   each said left inner layer, right inner layer and top inner layer having a color similar to a black color and having a granular layer surface.

2. The display visor of claim 1 wherein each said left inner granular layer, right inner granular layer and top inner granular layer having a plurality of minute recesses and projections.

3. The display visor of claim 2 wherein said black color being located in each of said plurality of recesses and on each of said plurality of projections.

4. The display visor of claim 3 including a left minute hook and loop strip for connection of the left wall and its left inner layer to a left side surface of the computer display unit, and including a right minute hook and loop strip for connection of the right wall and its right inner layer to a right side surface of the computer display unit.

5. The display visor of claim 2 including a left minute hook and loop strip for connection of the left wall and its left inner layer to a left side surface of the computer display unit, and including a right minute hook and loop strip for connection of the right wall and its right inner layer to a right side surface of the computer display unit.

6. The display visor of claim 1 including a left minute hook and loop strip for connection of the left wall and its left inner layer to a left side surface of the computer display unit, and including a right minute hook and loop strip for connection of the right wall and its right inner layer to a right side surface of the computer display unit.

7. A display visor for connection to a display unit of a computer work station comprising:
   a left wall, a right wall and a top wall;
   said left wall having a left inner layer;
   said right wall having a right inner layer;
   said top wall having a top inner layer;
   each said left inner layer, right inner layer and top inner layer having a color similar to a black color and having a granular layer surface;
   a left minute hook and eye strip for connection of the left wall and its left inner layer to a left side surface of the computer display unit, a right minute hook and eye strip for connection of the right wall and its right inner layer to a right side surface of the computer display unit, a left substantially L-shaped foam corner piece attached to the left minute hook and eye strip at its upper end and including a right L-shaped foam corner piece attached to the right minute hook and eye strip at its upper end.

8. A display visor for connection to a display unit of a computer work station comprising:
   a left wall, a right wall and a top wall;
   a left wall having a left inner layer;
   said right wall having a right inner layer;
   said top wall having a top inner layer;
   each said left inner layer, right inner layer and top inner layer having a color similar to a black color and having a granular layer surface; each said left inner granular layer, right inner granular layer and top inner granular layer having a plurality of a minute recesses and projections, a left minute hook and loop strip for connection of the left wall and its left inner layer to a left side surface of the computer display unit, and including a right minute hook and loop strip for connection of the right wall and its right inner layer to a right side surface of the computer display unit, a left substantially L-shaped foam corner piece in contact with the left minute hook and loop strip at its upper end and including a right substantially L-shaped foam corner piece in contact with the right minute hook and loop strip at its upper end.

9. A display visor for connection to a display unit of a computer work station comprising:
   a left wall, a right wall and a top wall;
   said left wall having a left inner layer;
   said right wall having a right inner layer;
   said top wall having a top inner layer;
   each said left inner layer, right inner layer and top inner layer having a color similar to a black color and having a granular layer surface, each said left inner granular layer, right inner granular layer and top inner granular layer having a plurality of minute recesses and projections, said black color being located in each of said plurality of recesses and on each of said plurality of projections, a left minute hook and loop strip for connection of the left wall and its left inner layer to a left side surface of the computer display unit, and including a right minute hook and loop strip for connection of the right wall and its right inner layer to a right side surface of the computer display unit, a left substantially L-shaped foam corner piece in contact with the left minute hook and loop strip at its upper end and including a right substantially L-shaped foam corner piece in contact with the right minute hook and loop strip at its upper end.

10. The display visor of claim wherein the display visor has an outer surface having a color which matches an outer surface color of the display unit of the computer work station.

11. The display visor of claim 10 wherein the outer surface color of the display visor is a substantially beige color.

12. The display visor of claim 11 wherein the visor is made of plastic.

13. A display visor for connection to a display unit of a computer work station comprising:
a left wall, a right wall and a top wall;
said left wall having a left inner layer;
said right wall having a right inner layer;
said top wall having a top inner layer;
each said left inner layer, right layer and top inner layer having a color similar to a black color and having a granular layer surface, a bent lip is connected to said top wall having an end below said top wall.

14. A method of making a display visor for a display unit of a work station including the steps of:
forming a semi-flexible member into a U-shape having a left wall, right wall and top wall; and
providing a left inner layer, right inner layer and top inner layer of a substantially black colored granular material respectively on the left wall, right wall and top wall at the inner surfaces thereof.

* * * * *